United States Patent
Yamamoto

(10) Patent No.: US 10,137,961 B2
(45) Date of Patent: Nov. 27, 2018

(54) BICYCLE DRIVE UNIT

(71) Applicant: Shimano Inc., Sakai, Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/348,256

(22) Filed: Nov. 10, 2016

(65) Prior Publication Data

US 2017/0152002 A1 Jun. 1, 2017

(30) Foreign Application Priority Data

Nov. 30, 2015 (JP) ................................. 2015-233015

(51) Int. Cl.
| | |
|---|---|
| B62M 6/55 | (2010.01) |
| B62M 11/14 | (2006.01) |
| F16H 3/54 | (2006.01) |
| F16H 37/04 | (2006.01) |
| B62M 6/50 | (2010.01) |

(52) U.S. Cl.
CPC ............... *B62M 6/55* (2013.01); *B62M 6/50* (2013.01); *B62M 11/14* (2013.01); *B62M 11/145* (2013.01); *F16H 3/54* (2013.01); *F16H 37/04* (2013.01); *F16H 2200/2005* (2013.01); *F16H 2200/2066* (2013.01); *F16H 2200/2082* (2013.01)

(58) Field of Classification Search
USPC .......................................................... 475/4
See application file for complete search history.

(56) References Cited

U.S. PATENT DOCUMENTS

| | | | | |
|---|---|---|---|---|
| 6,080,073 A | * | 6/2000 | Liu | ........................... B62M 6/55 |
| | | | | 180/206.1 |
| 9,803,750 B2 | * | 10/2017 | Hayslett | ................... F16H 63/50 |
| 2016/0107721 A1 | * | 4/2016 | Urabe | ....................... B62M 6/55 |
| | | | | 475/4 |
| 2016/0280328 A1 | * | 9/2016 | Yamamoto | .............. B62M 11/14 |
| 2016/0288872 A1 | * | 10/2016 | Shahana | ................... B62M 6/55 |

FOREIGN PATENT DOCUMENTS

| | | |
|---|---|---|
| EP | 2801516 A1 | 11/2014 |
| JP | H08207878 A | 8/1996 |
| JP | 2623419 B2 | 6/1997 |
| JP | 2010515871 A | 5/2010 |
| JP | 2012159202 A | 8/2012 |
| WO | 2013156445 A1 | 10/2013 |

* cited by examiner

*Primary Examiner* — Dirk Wright
(74) *Attorney, Agent, or Firm* — Global IP Counselors, LLP

(57) ABSTRACT

A bicycle drive unit has a planetary gear mechanism, a switching mechanism, a motor and a housing. The planetary gear mechanism includes an input body, an output body and a plurality of transmission paths having different transmission ratios between the input body and the output body. The switching mechanism is configured to switch between the plurality of transmission paths. The motor is configured to transmit rotational force to the input body. The housing rotatably supports a crankshaft and on which are provided the planetary gear mechanism, the switching mechanism and the motor. A manual drive force that is input to the crankshaft joins with a rotational force that is output from the output body of the planetary gear mechanism in a transmission path of a driving force from the output body of the planetary gear mechanism to a wheel.

24 Claims, 7 Drawing Sheets

BICYCLE DRIVE UNIT

CROSS-REFERENCE TO RELATED APPLICATIONS

This application claims priority to Japanese Patent Application No. 2015-233015, filed on Nov. 30, 2015. The entire disclosure of Japanese Patent Application No. 2015-233015 is hereby incorporated herein by reference.

BACKGROUND

Field of the Invention

The present invention relates to a bicycle drive unit.

Background Information

Some bicycles are provided with a bicycle drive unit to assist the rider by generating an auxiliary drive force. A bicycle drive unit comprises a motor for assisting the manual drive force. In addition to the motor, the bicycle drive unit further comprises a reduction gear that decelerates and outputs the rotation of the motor, a coupling member to which rotation is transmitted from each of the reduction gear and a crankshaft, and the like. One example of such a conventional bicycle drive unit is disclosed in Japanese Patent No. 2,623,419.

SUMMARY

Generally, the present disclosure is directed to various features of a bicycle drive unit. In a conventional drive unit, the rotational speed of the motor is proportional to the rotational speed of the crank. Since the motor has a characteristic in which the output torque varies according to the rotational speed, there is the risk that the output torque of the motor will become insufficient, thereby either reducing the assisting force, or reducing the driving efficiency of the motor, depending on the rotational speed of the crank.

One object of the present invention is to provide a bicycle drive unit that can suppress at least one of a reduction in the assisting force and a reduction in the driving efficiency of the motor, accompanying a change in the rotational speed of the crank.

In view of the state of the known technology and in accordance with a first aspect of the present disclosure, a bicycle drive unit according to the present invention comprises a planetary gear mechanism, a switching mechanism, a motor and a housing. The planetary gear mechanism comprises an input body, an output body and a plurality of transmission paths having different transmission ratios between the input body and the output body. The switching mechanism is configured to switch between the plurality of transmission paths. The motor is configured to transmit rotational force to the input body. The housing is configured to rotatably support a crankshaft. The planetary gear mechanism, the switching mechanism, and the motor are provided on the housing. A manual drive force that is input to the crankshaft is joined with a rotational force that is output from the output body of the planetary gear mechanism in a transmission path of a driving force from the output body of the planetary gear mechanism to a wheel.

According to one example of the bicycle drive unit, the output body is configured to be one of directly connected to the crankshaft and indirectly connected to the crankshaft via a coupling member that is coupled to the crankshaft.

According to one example of the bicycle drive unit, the coupling member is one of directly coupled to the crankshaft and indirectly connected to the crankshaft via a one-way clutch.

According to one example of the bicycle drive unit, the planetary gear mechanism further comprises a transmission body that transmits rotation of the input body to the output body. The switching mechanism is configured to switch between a first state, in which the input body and the output body are integrally rotated, and a second state in which the input body and the output body are rotated relative to each other.

According to one example of the bicycle drive unit, the switching mechanism comprises a switching unit that switches a connection state of the input body and the output body to the first state by connecting the transmission body and the output body, and that switches the connection state of the input body and the output body to the second state by releasing a connection between the transmission body and the output body.

According to one example of the bicycle drive unit, the switching unit comprises a pawl and an engagement portion. The pawl is provided on one of the transmission body and the output body and configured to protrude from the one of the transmission body and the output body toward the other of the transmission body and the output body. The engagement portion is provided on the other of the transmission body and the output body in which the pawl is configured to selectively engage the engagement portion. The pawl is engaged with the engagement portion in the first state, and the pawl is separated from the engagement portion in the second state.

According to one example of the bicycle drive unit, the input body comprises a sun gear. The output body comprises a planetary gear that is engaged with the sun gear and a carrier that rotatably supports the planetary gear. The transmission body comprises a ring gear that is engaged with the planetary gear.

According to one example of the bicycle drive unit, the input body has a rotational axis that is offset from a rotational axis of the crankshaft.

According to one example of the bicycle drive unit, the input body has a rotational axis that is coaxial with a rotational axis of the crankshaft.

According to one example of the bicycle drive unit, the switching mechanism further comprises an actuator configured to control the switching unit.

According to one example of the bicycle drive unit, the actuator comprises a biasing member, a movable member and a drive unit. The biasing member applies a force to the pawl so that the pawl projects from one of the transmission body and the output body. The movable member is configured to cause the pawl to operate so that the pawl moves away from the engagement portion by coming in contact with the pawl. The drive unit switches between the first state and the second state by moving the movable member.

According to one example of the bicycle drive unit, the actuator comprises a biasing member, a movable member and a drive unit. The biasing member applies a force to the pawl so that the pawl moves away from the engagement portion. The movable member is configured to cause the pawl to operate so that the pawl projects from one of the transmission body and the output body by coming in contact with the pawl. The drive unit switches between the first state and the second state by involving the movable member.

One example of the bicycle drive unit further comprises a support portion configured to support the transmission body. The switching mechanism further comprises a one-way clutch that is disposed between the support portion and the transmission body. The one-way clutch is configured to permit rotation of the transmission body in a first direction and prevent rotation of the transmission body in a second direction, which is the opposite of the first direction.

According to one example of the bicycle drive unit, the planetary gear mechanism further comprises a transmission body that transmits rotation of the input body to the output body. The output body and the transmission body each comprise a plurality of gears having different total numbers of teeth.

According to one example of the bicycle drive unit, the output body comprises a first planetary gear, a second planetary gear and a carrier. The second planetary gear has a different total number of teeth than the first planetary gear and integrally rotates with the first planetary gear as a unit. The carrier rotatably supports the first planetary gear and the second planetary gear. The transmission body comprises a first sun gear and a second sun gear. The first sun gear is engaged with the first planetary gear. The second sun gear is disposed coaxially with the first sun gear, and is engaged with the second planetary gear; and the input body comprises a ring gear that is engaged with one of the first planetary gear and the second planetary gear. The switching mechanism is configured to restrict the rotation of at least one of the first sun gear and the second sun gear.

According to one example of the bicycle drive unit, a total number of teeth on the second sun gear is greater than a total number of teeth on the first sun gear.

According to one example of the bicycle drive unit, the switching mechanism comprises a support shaft and a switching unit. The support shaft rotatably supports the first sun gear and the second sun gear. The switching unit switches between a first state, in which the first sun gear is non-rotatable with respect to the support shaft, and a second state, in which the first sun gear is rotatable with respect to the support shaft.

According to one example of the bicycle drive unit, the switching mechanism further comprises a one-way clutch that is disposed between the support shaft and the second sun gear. The one-way clutch is configured to permit the rotation of the second sun gear when the input body is rotated by the motor in the first state.

According to one example of the bicycle drive unit, the output body comprises a first planetary gear, a second planetary gear and a carrier. The second planetary gear has a different total number of teeth than the first planetary gear, and integrally rotates with the first planetary gear. The carrier rotatably supports the first planetary gear and the second planetary gear. The transmission body comprises a first ring gear and a second ring gear. The first ring gear is engaged with the first planetary gear. The second ring gear is disposed coaxially with the first ring gear and is engaged with the second planetary gear. The input body comprises a sun gear that is engaged with one of the first planetary gear and the second planetary gear. The switching mechanism is configured to restrict rotation of at least one of the first ring gear and the second ring gear.

According to one example of the bicycle drive unit, a total number of teeth of the first ring gear is greater than a total number of teeth of the second ring gear.

According to one example of the bicycle drive unit, the switching mechanism comprises a switching unit that switches between a first state, in which the first ring gear is non-rotatable, and a second state, in which the first ring gear is rotatable.

One example of the bicycle drive unit further comprises a support portion supporting the first ring gear and the second ring gear. The switching mechanism further comprises a one-way clutch that is disposed between the support portion and the second ring gear. The one-way clutch is configured to permit rotation of the second ring gear while the input body is rotated by the motor in the first state.

One example of the bicycle drive unit further comprises a speed reducer connected to the motor and the input body. The speed reducer is configured to reduce a rotational speed of the motor and transmit rotation to the input body.

One example of the bicycle drive unit further comprises the crankshaft.

The bicycle drive unit of the present invention is configured to suppress at least one of a reduction in the assisting force and a reduction in the driving efficiency of the motor accompanying a change in the rotational speed of the crank.

BRIEF DESCRIPTION OF THE DRAWINGS

Referring now to the attached drawings which form a part of this original disclosure.

DETAILED DESCRIPTION OF EMBODIMENTS

Figure 1:
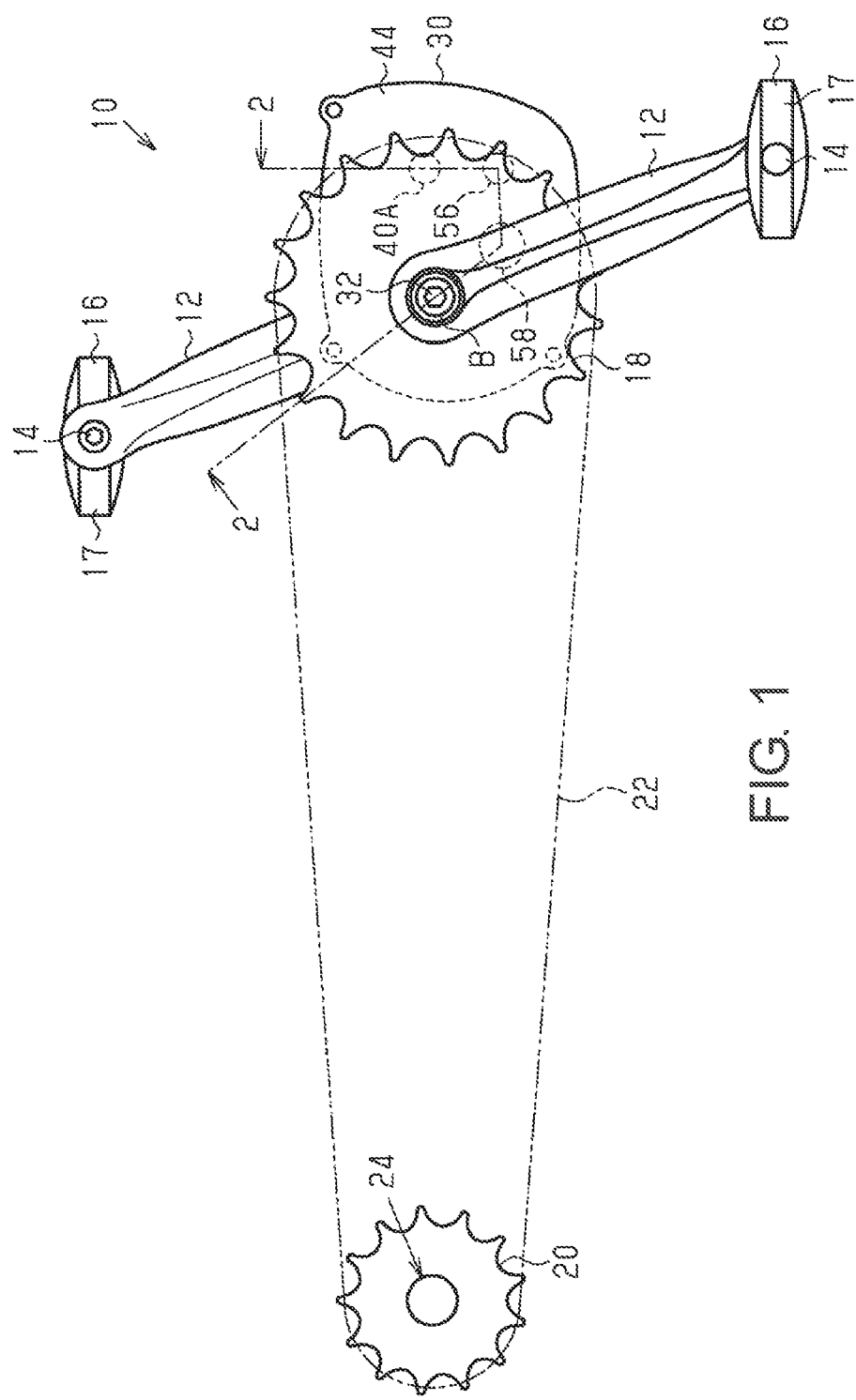
FIG. 1 is a side elevational view of a drivetrain of an electrically assisted bicycle equipped with a bicycle drive unit in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

An electrically assisted bicycle 10 shown in FIG. 1 comprises a bicycle drive unit (hereinafter referred to as "drive unit 30") in accordance with a first embodiment. In one example, the electrically assisted bicycle 10 further comprises a pair of crank arms 12, a pair of pedals 16, a front sprocket 18, a rear sprocket 20, a chain 22 and a first clutch 24.

The crank arms 12 are coupled to the ends of a crankshaft 32 in a state of being integrally rotatable with the crankshaft 32 of the drive unit 30. The crank arms 12 form a crank together with the crankshaft 32. The pedals 16 each comprises a pedal main body 17 and a pedal shaft 14. The pedal shafts 14 are coupled to the crank arms 12, respectively, in a state of being integrally rotatable with the crank arms 12. The pedal main bodies 17 are supported on the pedal shafts 14, respectively, in a state of being rotatable with respect to the pedal shafts 14.

The front sprocket 18 is coupled with the drive unit 30 via a coupling member 44 of the drive unit 30. The rear sprocket 20 is coupled with a rear wheel (not shown) of the electrically assisted bicycle 10 via the first clutch 24. The chain 22 is engaged with the front sprocket 18 and the rear sprocket 20.

The function of the drive unit 30 is to assist the manual drive force that is inputted to the crankshaft 32. The drive unit 30 is mounted to a frame of the electrically assisted bicycle 10 and is detachable with respect to the frame. An example of a means to join the drive unit 30 and the frame are bolts or resin bands. A battery (not shown) is mounted on the frame of the electrically assisted bicycle 10. The battery (not shown) is configured to supply electrical energy to the drive unit 30.

Figure 2:
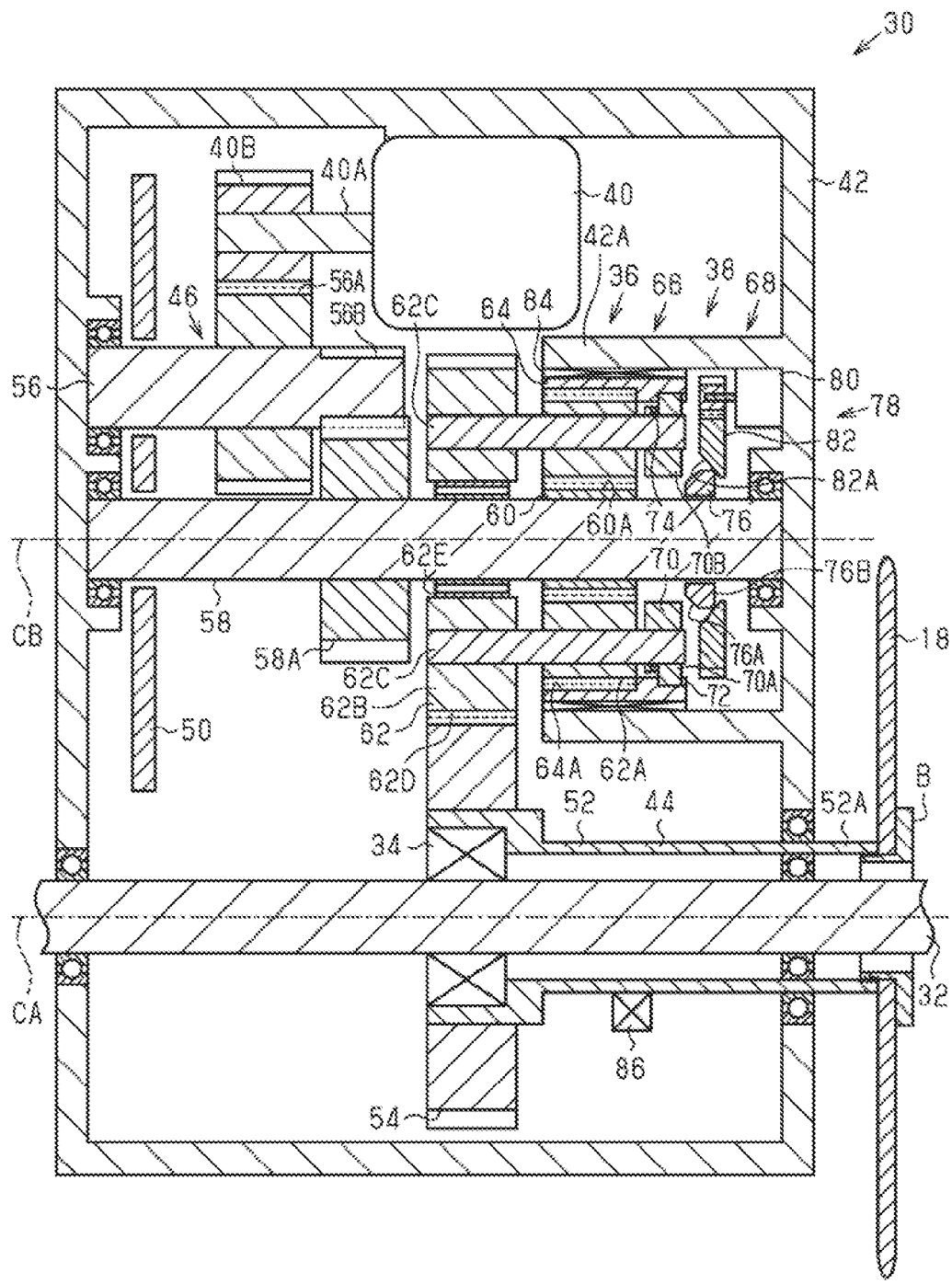
FIG. 2 is a cross-sectional view of the bicycle drive unit as seen along section line 2-2 in FIG. 1, when the switching mechanism is in the first state.

As shown in FIG. 2, the drive unit 30 comprises a planetary gear mechanism 36, a switching mechanism 38, a motor 40 and a housing 42. One example of a motor 40 is an electric motor. In one example, the drive unit 30 further comprises the crankshaft 32, a second clutch 34, a coupling member 44, a speed reducer 46 and a controller 50.

The housing 42 rotatably supports the crankshaft 32. The crankshaft 32 is supported by the drive unit 30 in a state of being rotatable with respect to the drive unit 30. Both ends of the crankshaft 32 protrude from the housing 42. The planetary gear mechanism 36, the switching mechanism 38, the motor 40, the coupling member 44, the second clutch 34, the speed reducer 46 and the controller 50 are provided in the housing 42.

The coupling member 44 comprises a hollow shaft 52 and a gear 54. The hollow shaft 52 is supported by the housing 42 and the crankshaft 32 in a state of being rotatable with respect to the housing 42. One end 52A of the hollow shaft 52 protrudes from the housing 42. The crankshaft 32 is inserted in the hollow shaft 52 so that both ends protrude from the hollow shaft 52. The gear 54 is attached to the hollow shaft 52 in a state of being non-rotatable with respect to the hollow shaft 52. The gear 54 is provided coaxially with the hollow shaft 52. In another example, the gear 54 can be integrally formed with the hollow shaft 52 during the formation of the hollow shaft 52.

The second clutch 34 is provided between the outer perimeter of the crankshaft 32 and the inner perimeter of the coupling member 44. The second clutch 34 transmits rotation from the crankshaft 32 to the coupling member 44 while the crankshaft 32 is rotated forward. The second clutch 34 is uncoupled from the crankshaft 32 and the coupling member 44 so as to not transmit rotation from the crankshaft 32 to the coupling member 44 when the crankshaft 32 is rotated rearward. In this manner, the coupling member 44 is coupled to the crankshaft 32 via the second clutch 34. The coupling member 44 is provided around the rotational axis of the crankshaft 32, and is configured to be rotated around the rotational axis of the crankshaft 32. In another example, the coupling member 44 is coupled with the crankshaft 32 without interposing the second clutch 34. In this case, the crankshaft 32 and the coupling member 44 are always integrally rotated.

The front sprocket 18 is arranged on the side of the housing 42 and located outside of the housing 42. The front sprocket 18 is attached to the drive unit 30 by a bolt B. The bolt B is screwed to the coupling member 44 so that the front sprocket 18 is fixed between the coupling member 44 and the bolt B.

When a manual drive force is inputted to the pedals 16 in a forward direction to rotate the crankshaft 32 as shown in FIG. 1, the crankshaft 32 is also rotated forward with respect to the frame of the electrically assisted bicycle 10. In this case, the rotation of the crankshaft 32 is transmitted to the front sprocket 18 via the second clutch 34 and the coupling member 44, as shown in FIG. 2, and the rotation of the front sprocket 18 is transmitted to the rear sprocket 20 via the chain 22, as shown in FIG. 1. When a manual drive force is inputted to the pedals 16 in a rearward direction to rotate the crankshaft 32, the crankshaft 32 is also rotated rearward with respect to the frame. In this case, the rotation of the crankshaft 32 is not transmitted to the coupling member 44 and the front sprocket 18 by the action of the second clutch 34, as shown in FIG. 2.

The speed reducer 46 is coupled to the motor 40 and the input body 60. The speed reducer 46 is configured to reduce the rotational speed of the motor 40 and transmitting the rotational speed of the motor 40 to the input body 60. As shown in FIG. 2, the speed reducer 46 comprises a first rotational shaft 56 and a second rotational shaft 58. The first rotational shaft 56 is rotatably supported in the housing 42. The first rotational shaft 56 is provided in a position adjacent to the output shaft 40A of the motor 40. The first rotational shaft 56 is supported in the housing 42 via a plurality of bearings provided at intervals in the axial direction. The second rotational shaft 58 is provided parallel to the first rotational shaft 56 away from the rotational axis CA of the crankshaft 32. The second rotational shaft 58 is rotatably supported in the housing 42 via a plurality of bearings provided at intervals in the axial direction.

The speed reducer 46 further comprises a gear 40, a first gear 56A, a second gear 56B and a gear 58A. The gear 40B is provided on the output shaft 40A of the motor 40. The first gear 56A and the second gear 56B are provided on the first rotational shaft 56. The gear 58A is provided on the second rotational shaft 58. The first gear 56A is provided coaxially with the first rotational shaft 56. The first gear 56A is fixed to the first rotational shaft 56. Therefore, the first gear 56A is integrally rotated with the first rotational shaft 56. The first gear 56A is engaged with the gear 40B. The total number of teeth on the gear 40B is less than the total number of teeth on the first gear 56A. Accordingly, the rotation of the motor 40 is decelerated and transmitted to the first rotational shaft 56. The second gear 56B is provided on a portion of the first rotational shaft 56 that is different from the portion on which the first gear 56A is provided. The second gear 56B is provided coaxially with the first rotational shaft 56. The second gear 56B is fixed to the first rotational shaft 56. Therefore, the second gear 56B is integrally rotated with the first rotational shaft 56. The second gear 56B is engaged with the gear 58A. The total number of teeth on the second gear 56B is less than the total number of teeth on the gear 58A. Accordingly, the rotation of the first rotational shaft 56 is decelerated and transmitted to the second rotational shaft 58. The gear 40B can be formed integrally with the output shaft 40A of the motor 40, or can be formed separately and coupled thereto. At least one of the first gear 56A and the second gear 56B can be formed integrally with the first rotational shaft 56, or can be formed separately and coupled thereto. The gear 58A can be formed integrally with the second rotational shaft 58, or be formed separately and coupled thereto.

The planetary gear mechanism 36 is provided on a portion of the second rotational shaft 58 that is different from the portion on which the gear 58A is provided. The planetary gear mechanism 36 is provided coaxially with the second rotational shaft 58. The second rotational shaft 58 is coupled with the input body 60 of the planetary gear mechanism 36. The rotation of the second rotational shaft 58 is inputted to the input body 60.

The planetary gear mechanism 36 comprises an input body 50, an output body 62 and a transmission body 64. The planetary gear mechanism 36 comprises a plurality of transmission paths having different transmission ratios between the input body 60 and the output body 62. The input body 60 comprises a sun gear 60A. The sun gear 60A is provided on the outer perimeter of the second rotational shaft 58 so as to be coaxially disposed with the second rotational shaft 58. The sun gear 60A is integrally rotated with the second rotational shaft 58. The rotational axis GB of the input body 60 is separated from the rotational axis CA of the crankshaft 32. The sun gear 60A can be integrally formed with the second rotational shaft 58.

The output body 52 comprises a plurality of planetary gears 52A, a carrier 52B and a plurality of planetary pins 62C. The planetary gears 62A are engaged with the sun gear 60A. The carrier 62B rotatably supports the planetary gears 62A. The planetary pins 62C rotatably support the planetary gears 62A. The carrier 62B rotatably supports the planetary gears 62A via the planetary pins 52C that extend through each of the planetary gears 62A in the axial direction. In another example, the carrier 62B can rotatably support the planetary gears 62A by the planetary pins 62C being integrally rotated with the planetary gears 62A and rotatably supported by the carrier 62B. The carrier 52B can be supported on the second rotational shaft 58 via a bearing 62E. The carrier 62B can be configured to support the two ends of the planetary pins 62C.

The transmission body 64 transmits the rotation of the input body 60 to the output body 52. The transmission body 64 comprises a ring gear 64A that is engaged with the planetary gears 62A. The transmission body 64 is supported on the support portion 42A of the housing 42 via a one-way clutch 84. The transmission body 64 is formed in a tubular shape.

The planetary gears 62A are disposed between the sun gear 60A and the ring gear 64A. The planetary gears 62A are engaged with the sun gear 60A and the ring gear 64A. The output body 62 is connected to the coupling member 44 that is coupled to the crankshaft 32. The carrier 62B has a gear 62D on the outer perimeter. The gear 62D is engaged with the gear 54 of the coupling member 44.

The switching mechanism 38 is configured to switch between a first state and a second state. In the first state, the input body 60 and the output body 62 are integrally rotated, in the second state, the input body 60 and the output body 62 rotate relative to each other. The switching mechanism 38 is configured to switch between a plurality of transmission paths provided by the planetary gear mechanism 36 by switching between the first state and the second state. The switching mechanism 38 comprises a switching unit 66 and an actuator 68. The actuator 68 controls the switching unit 66.

The switching unit 66 switches the connection state of the input body 60 and the output body 62 to the first state b connecting the transmission body 64 and the output body 62. The switching unit 66 switches the connection state of the input body 60 and the output body 62 to the second state by releasing the connection between the transmission body 64 and the output body 62. Specifically, the switching unit 66 comprises a plurality of pawls 70 and a plurality of engagement portions 72. The pawl 70 is provided on the output body 62. The pawl 70 can protrude from the output body 62 toward the transmission body 64. The carrier 62B has an annular portion that supports the pawls 70. The pawls 70 are provided side-by-side in a circumferential direction of the outer perimeter of the annular portion of the carrier 62B. The pawls 70 are pivotally provided on the planetary pins 62C. The pawls pawl 70 can be pivotally provided to a pin that is separate from the planetary pins 62C. The engagement portions 72 are provided on the transmission body 64 such that the pawls 70 can be engaged with the engagement portions 72. The pawls 70 are engaged with the engagement portions 72 in the first state, and the pawls 70 are separated from the engagement portion 72 in the second state. The engagement portions 72 are formed in the inner perimeter of the transmission body 64. The engagement portions 72 comprises one or more recesses and/or protrusions. The engagement portions 72 can be formed by a ratchet groove. Each of the pawls 70A has a first end 70A and a second end 70B. The first ends 70A of the pawls 70 are configured to engage the engagement portions 72. The planetary pins 62C are disposed between the first end 70A and the second end 70B of the pawls 70.

The actuator 58 comprises a biasing member 74, a movable member 76 and a drive unit 78. The biasing member 74 applies a force to the pawl 70 so that the pawl 70 protrudes from the output body 62. The biasing member 74 is, for example, an annular spring. The biasing member 74 is attached to the outer perimeter of the pawl 70.

The movable member 76 is configured to cause the pawls 70 to operate so that the pawls 70 move away from the engagement portions 72 by coming in contact with the pawls 70. The movable member 75 is an annular member that is supported in the housing 42 via the second rotational shaft 58 around the second rotational shaft 58 so as to be relatively rotatable with the second rotational shaft 58. The movable member 76 is provided in a position in which a first end surface 76A thereof in the axial direction opposes the second ends 70B of the pawls 70. The first end surface 76A comprises a tapered surface that is inclined radially outward in a direction away from the pawls 70. When the movable member 76 is moved toward the second ends 70B of the pawls 70, the second ends 70B of the pawls 70 are moved along with the first ends 70A as the pawls 70 move around the planetary pins 62C. The protrusion amounts of the pawls 70 from the output body 52 are thereby reduced. The movable member 76 is biased in a direction away from the pawls 70 in the axial direction by, for example, a spring.

The drive unit 78 switches between the first state and the second state by moving the movable member 75. The drive unit 78 comprises a shifting motor 80 and an annular member 82. The annular member 82 is supported in the housing 42 around the second rotational shaft 58 so as to be relatively rotatable with the second rotational shaft 58. The annular member 82 comprises a cam surface 82A on an end face in the axial direction. The movable member 76 is in contact with the cam surface 82A of the annular member 82.

The cam surface 82A is configured to come in contact with a second end surface 76B of the movable member 76 in the axial direction. The annular member 82 is connected to the shifting motor 80 to be rotated by the shifting motor 80. When the annular member 82 is rotated by the drive of the shifting motor 80, the movable member 76 is moved in a direction approaching the pawls 70, or in a direction away from the pawls 70, depending on the rotational direction of the annular member 82.

The switching mechanism 38 further comprises a one-way clutch 84 that is disposed between the support portion 42A of the housing 42 and the transmission body 64. The one-way clutch 84 permits rotation of the transmission body 64 in the first direction, and prevents rotation of the transmission body 64 in the second direction, which is the opposite of the first direction.

As shown in FIG. 2, when the movable member 76 is away from the pawls 70, the pawls 70 protrude toward the engagement portion 72 by the biasing member 74. At this time, the pawls 70 are engaged with the engagement portions 72. Accordingly, the output body 62 and the transmission body 64 are integrally rotated. At this time, if the rotation that is inputted to the input body 60 is a rotation in a direction to move the electrically assisted bicycle 10 forward, then the rotational force in a first direction is applied to the transmission body 64. Since the transmission body 64 is permitted to rotate in the first direction by the one-way clutch 84, the sun gear 60A, the planetary gear 62A and the ring gear 64 of the planetary gear mechanism 36 are integrally rotated around the rotational axis of the second rotational shaft 58. The transmission ratio of the planetary gear mechanism 36 at this time is "1." That is, when the output body 62 and the transmission body 64 are coupled and the input body 60 and the output body 62 are integrally rotated, the planetary gear mechanism 36 does not shift the rotation that is inputted to the input body 60 and outputs the same rotation from the output body 62 by the first transmission path.

Figure 3:
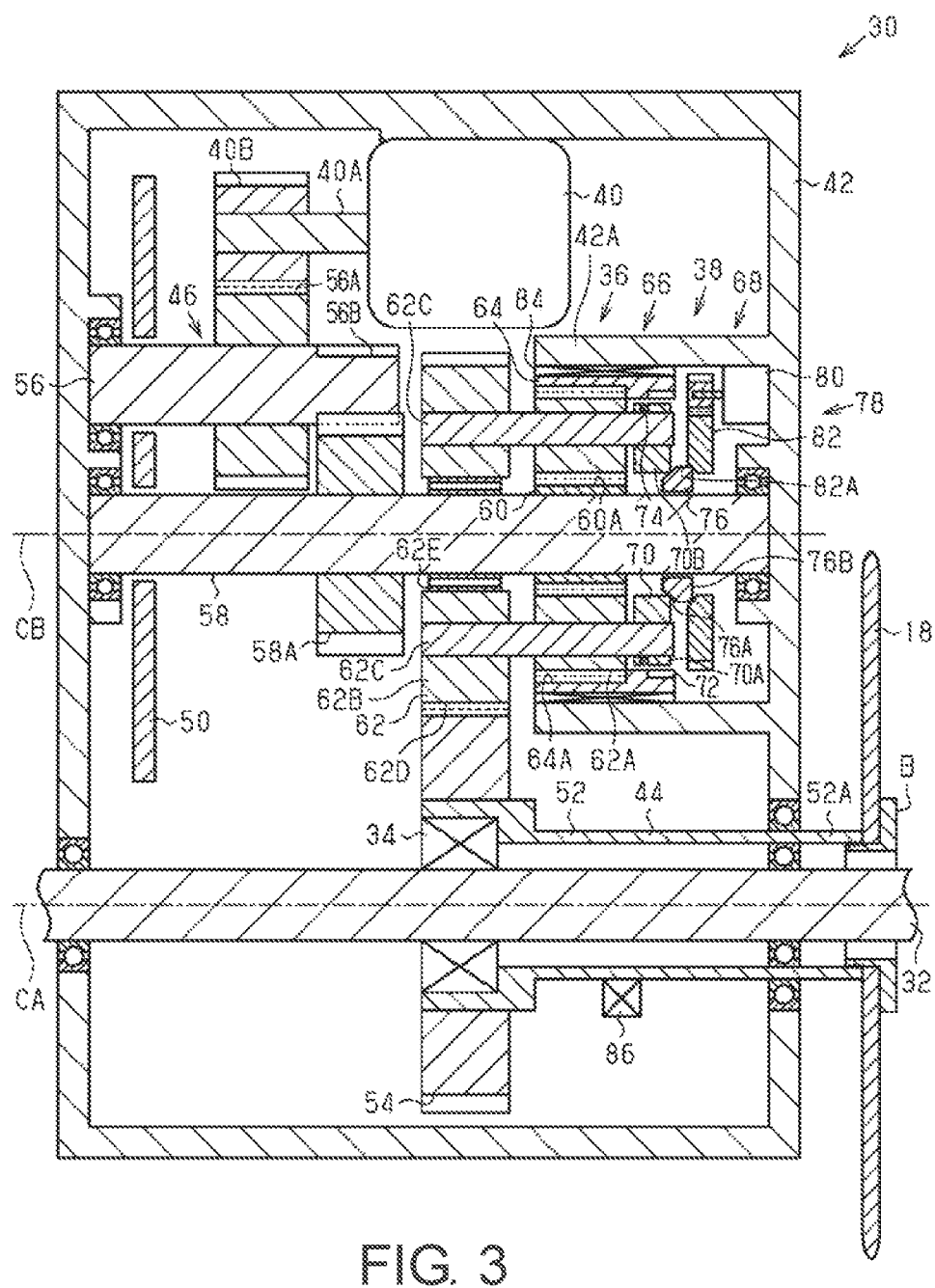
FIG. 3 is a cross-sectional view of the bicycle drive unit as seen along section line 2-2 in FIG. 1, when the switching mechanism is in the second state.

As shown in FIG. 3, the pawls 70 are separated from the engagement portions 72 by the movable member 76 approaching the pawls 70 and rotating the pawls 70 around the planetary pins 62C. Accordingly, the output body 62 and the transmission body 64 are permitted to relatively rotate. At this time, if the rotation that is inputted to the input body 60 is a rotation in a direction to move the electrically assisted bicycle 10 forward, then the rotational force in a second direction is applied to the transmission body 64. Since the transmission body 64 is prevented from being rotated in the second direction by the one-way clutch 34, the planetary gear mechanism 36 transmits the rotation that is inputted to the input body 60 from the output body 62, according to a transmission ratio corresponding to the total number of teeth of each of the sun gear 60A, the planetary gear 62A and the ring gear 64A. That is, when the engagement of the transmission body 64 and the output body 62 is released and the output body 62 and the input body 60 are permitted to relatively rotate, the planetary gear mechanism 36 reduces the speed of the rotation that is inputted to the input body 60 and outputs the same rotation from the output body 62 by the second transmission path.

The drive unit 30 further comprises a torque sensor 86 and a rotational speed sensor (not shown). The torque sensor 86 is, for example, a strain gauge, a semiconductor strain sensor, or a magnetostrictive sensor. The torque sensor 86 is attached to the hollow shaft 52 of the coupling member 44. The torque sensor 86 detects the torque that is applied to the coupling member 44.

When the rotation of the crankshaft 32 is transmitted to the coupling member 44 and the rotation of the motor 40 is not transmitted to the coupling member 44, the torque sensor 86 outputs a signal to the controller 50 that reflects the manual drive force that is inputted to the crankshaft 32. When the rotation of the crankshaft 32 and the rotation of the motor 40 are transmitted to the coupling member 44, the torque sensor 86 outputs a signal to the controller 50 that reflects the torque obtained by combining the manual drive force that is inputted to the crankshaft 32 and the torque of the motor 40 that is transmitted via the planetary gear mechanism 36.

The rotational speed sensor comprises a cadence sensor that detects the rotational speed of the crank. The cadence sensor detects, for example, a magnet that is provided on the crankshaft 32. The cadence sensor comprises a magnetism detection sensor, such as a reed switch or a Hall Effect element. The cadence sensor outputs a signal corresponding to the rotational speed of the crankshaft 32 to the controller 50. The cadence sensor can also be configured to detect a magnet that is provided on the crank arm 12. In this case, the cadence sensor outputs a signal to the controller 50 corresponding to the rotational speed of the crank arm 12. The rotational speed sensor can further comprise a speed sensor that detects the rotational speed of the front wheel or the rear wheel of the electrically assisted bicycle 10. The controller 50 is programmed to calculate the rotational speed of the crank based on the detection result of the rotational speed sensor.

The controller 50 is programmed to execute a control program that is set in advance. The controller 50 comprises a processor, for example, a CPU (Central Processing Unit) or an MPU (Micro Processing Unit). The controller 50 preferably includes a memory device for storing programs and data. The controller 50 controls the motor 40 and the shifting motor 80. The controller 50 controls the rotations of the motor 40 and the shifting motor 80 according to the manual drive force and the rotational speed of the crank. In one example, the controller 50 controls the outputs of the motor 40 and the shifting motor 80 based on the manual drive force that is detected by the torque sensor 86, and the rotational speed of the crank and the travel speed of the electrically assisted bicycle 10 that are detected by the rotational speed sensor.

When the rotational speed of the crank becomes higher than a predetermined speed from equal to or less than the predetermined speed, the controller 50 drives the shifting motor 80 to engage the input body 60 and the output body 62. When the rotational speed of the crank becomes lower than a predetermined speed from equal to or greater than the predetermined speed, the controller 50 drives the shifting motor 80 to release the engagement of the input body 60 and the output body 62.

The rotation that is shifted by the planetary gear mechanism 36 is transmitted to the coupling member 44. The rotation of the output body 62 and the rotation of the crankshaft 32 are combined in the coupling member 44. By such a configuration, the manual drive force that is inputted to the crankshaft 32 is joined with the rotational force that is output from the output body 62 of the planetary gear mechanism 36, in a transmission path of drive force from the output body 62 of the planetary gear mechanism 36 to a wheel (not shown) that is connected to the rear sprocket 20 (refer to FIG. 1). The rotation of the output body 62 is transmitted to the coupling member 44, and the rotation of the crankshaft 32 is applied thereto without interposing the planetary gear mechanism 36.

The action and effects of the drive unit 30 will now be described.

The drive unit 30 comprises the planetary gear mechanism 36 that changes the rotational speed of the motor 40 and transmits the rotation of the motor 40 to the coupling member 44. The switching mechanism 38 can shift the rotation of the motor 40 in two stages. According to this configuration, it becomes easy to suppress the rotational speed of the motor 40 within a prescribed range; therefore, it is possible to suppress at least one of a reduction in the assisting force, and a reduction in the driving efficiency of the motor, accompanying a change in the rotational speed of the crank.

Second Embodiment

Figure 4:
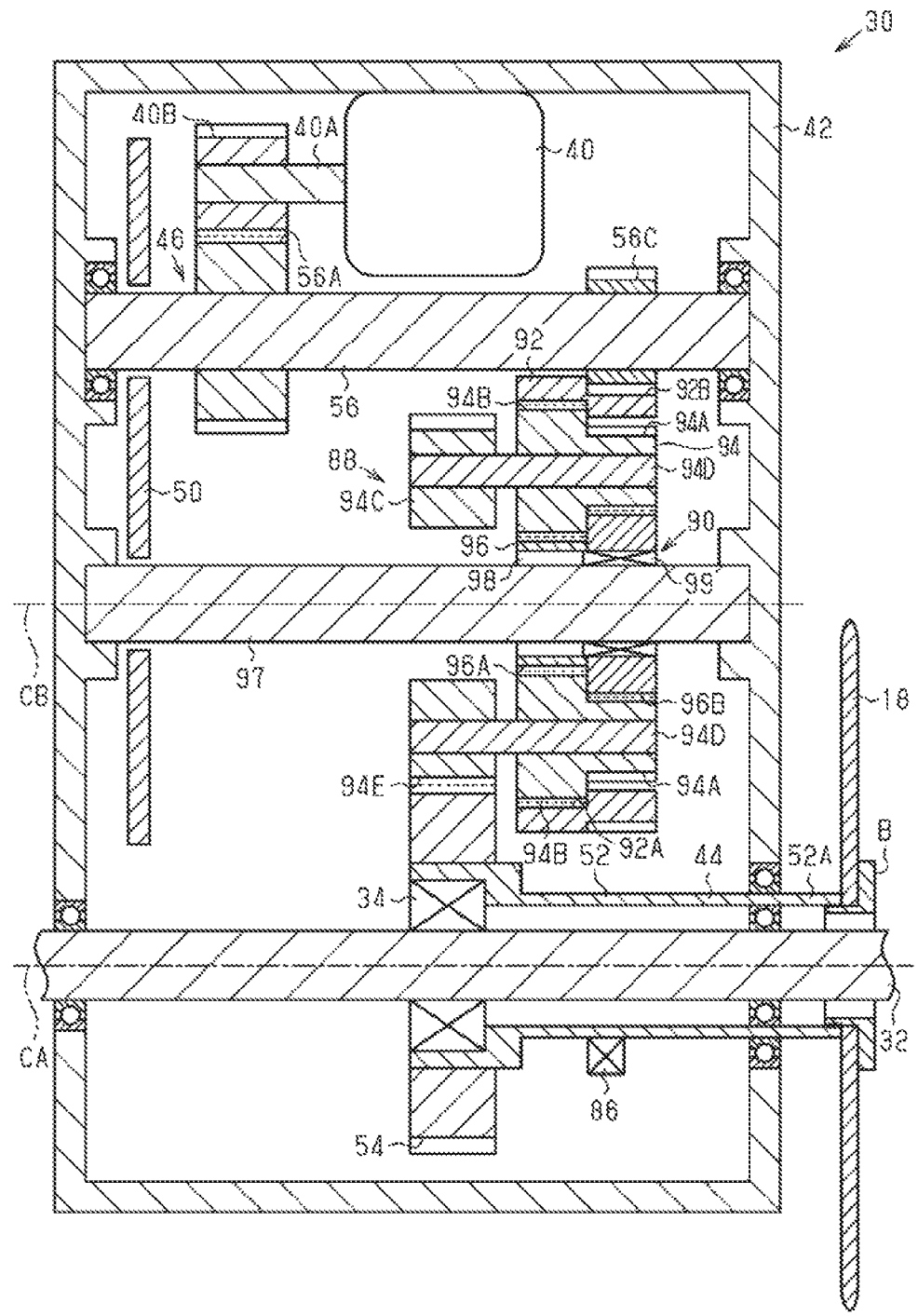
FIG. 4 is a cross-sectional view of the bicycle drive unit in accordance with a second embodiment.

The drive unit 30 of the second embodiment will be described, with reference to FIG. 4. The portions that are common to the first embodiment are given the same reference symbols, and the descriptions thereof will be omitted.

The drive unit 30 of the second embodiment comprises a planetary gear mechanism 88, a switching mechanism 90, a motor 40 and a housing 42. The planetary gear mechanism 88 comprises an input body 92, an output body 94 and a transmission body 96. The planetary gear mechanism 88 comprises a plurality of transmission paths having different transmission ratios between the input body 92 and the output body 94. The switching mechanism 90 is configured to switch between a plurality of transmission paths.

The output body 94 comprises a plurality of first planetary gears 94A, a plurality of second planetary gears 94B, a carrier 94C and a plurality of planetary pins 94D. The second planetary gears 94B have a different total number of teeth than the first planetary gears 94A. The second planetary gears 94B are integrally rotated with the first planetary gears 94A. The total number of teeth on the first planetary gears 94A is less than the total number of teeth on the second planetary gears 94B. The total number of the first planetary gears 94A and the total number of the second planetary gears 94B are equal. One first planetary gear 94A and one second planetary gear 94B are an integrally formed, so-called stepped planetary gear.

The planetary pins 94D extend through a plurality of planetary gears 94A and 94B and rotatably support the planetary gears 94A and 94B. The carrier 94C non-rotatably supports the planetary pins 94D, and rotatably supports the first planetary gears 94A and the second planetary gears 94B via the planetary pins 94D. In another example, the carrier 94C can rotatably support the planetary gears 94A and 94B, by the planetary pins 94D non-rotatably supporting the plurality of planetary gears 94A and 94B, and the carrier 94C rotatably supporting the planetary pins 94D.

The transmission body 96 comprises a first sun gear 96A and a second sun gear 96B. The first sun gear 96A is engaged with the first planetary gears 94A. The second sun gear 96B is disposed coaxially with the first sun gear 96A. The second sun gear 96B is engaged with the second planetary gears 94B. The total number of teeth of the second sun gear 96B is greater than the total number of teeth of the first sun gear 96A. That is, the output body 94 and the transmission body 96 each comprise a plurality of gears having different total numbers of teeth. The first sun gear 96A and the second sun gear 96B are provided around a support shaft 97 that is supported in the housing 42. The support shaft 97 rotatably supports the first sun gear 96A and the second sun gear 96B.

The input body 92 comprises a ring gear 92A that is engaged with the second planetary gear 94B. The transmission body 96 transmits the rotation of the input body 92 to the output body 94. In another example, the ring gear 92A can engage the first planetary gears 94A instead of the second planetary gears 94B. A gear 92B that is engaged with the gear 56C that is provided around the first rotational shaft 56 of the speed reducer 46 is provided to the outer perimeter part of the input body 92. The rotation of the motor 40 is transmitted to the input body 92 via the speed reducer 46.

The switching mechanism 90 is configured to regulate the rotation of at least one of the first sun gear 96A and the second sun gear 96B. The switching mechanism 90 comprises a support shaft 97, a switching unit 98 and a one-way clutch 99. The switching unit 98 switches between a first state and a second state. In the first state, the first sun gear 96A is non-rotatable with respect to the support shaft 97. In the second state, the first sun gear 96A is rotatable with respect to the support shaft 97. The switching unit 98 comprises one or more pawls (not shown) that can protrude from a shifting motor (not shown) and the support shaft 97 toward the first sun gear 96A. The switching unit 98 further comprises an engagement portion that is provided on the inner perimeter part of the transmission body 96. This engagement portion has the same shape as the engagement portion 72 in the first embodiment. The switching unit 98 switches between the first state and the second state by the drive of the shifting motor. Specifically, the first state in which the first sun gear 96A is non-rotatable with respect to the support shaft 97 is formed by the pawl being protruded toward the first sun gear 96A. The second state in which the first sun gear 96A is rotatable with respect to the support shaft 97 is formed by the pawl moving away from the first sun gear 96A. The switching unit 98 can be configured in any way as long as the movement of the pawl(s) can be controlled by the shifting motor. For example, the pawl(s) of the switching unit 98 is provided on the support shaft 97, and is biased to a position in which it comes in contact with the engagement portion of the first sun gear 96A by a spring. The shifting motor controls the position of the pawl(s) via a sleeve or a cam.

The one-way clutch 99 is disposed between the support shaft 97 and the second sun gear 96B. The one-way clutch 99 permits the rotation of the second sun gear 96B with respect to the support shaft 97 while the input body 92 is rotated by the motor 40 in the first state. The one-way clutch 99 restricts the rotation of the second sun gear 96B while the input body 92 is rotated by the motor 40 in the second state.

When the first state in which the first sun gear 96A is non-rotatable with respect to the support shaft 97 is formed by the switching unit 98, the rotation of the motor 40 that is transmitted to the input body 92 causes the planetary gears 94A and 94B to revolve around the first sun gear 96A while causing the same to rotate. At this time, the carrier 94C is rotated along with the planetary gears 94A and 94B, and the rotation of the carrier 94C is transmitted to the coupling member 44.

When the second state in which the first sun gear 96A is rotatable with respect to the support shaft 97 is formed by the switching unit 98, the rotation of the motor 40 that is transmitted to the input body 92 revolves the planetary gears 94A and 94B around the second sun gear 96B while causing the same to rotate. At this time, the carrier 94C is rotated along with the planetary gears 94A and 94B, and the rotation of the carrier 94C is transmitted to the coupling member 44. The total number of teeth on the second sun gear 96B is greater than the total number on teeth of the first sun gear 96A. Accordingly, the degree of deceleration of the rotation that is inputted to the input body 92 is greater in the second transmission path via the second sun gear 96B in the second state than in the first transmission path via the first sun gear 96A in the first state.

A gear 94E is provided on the outer perimeter of the carrier 94C. The gear 94E is engaged with the gear 54 of the coupling member 44. That is, the manual drive force that is inputted to the crankshaft 32 is joined with the rotational force that is output from the output body 94 of the planetary gear mechanism 88, in a transmission path of drive force from the output body 94 of the planetary gear mechanism 88 to a wheel (not shown). According to the second embodiment, the same effects as the first embodiment are obtained.

Third Embodiment

Figure 5:
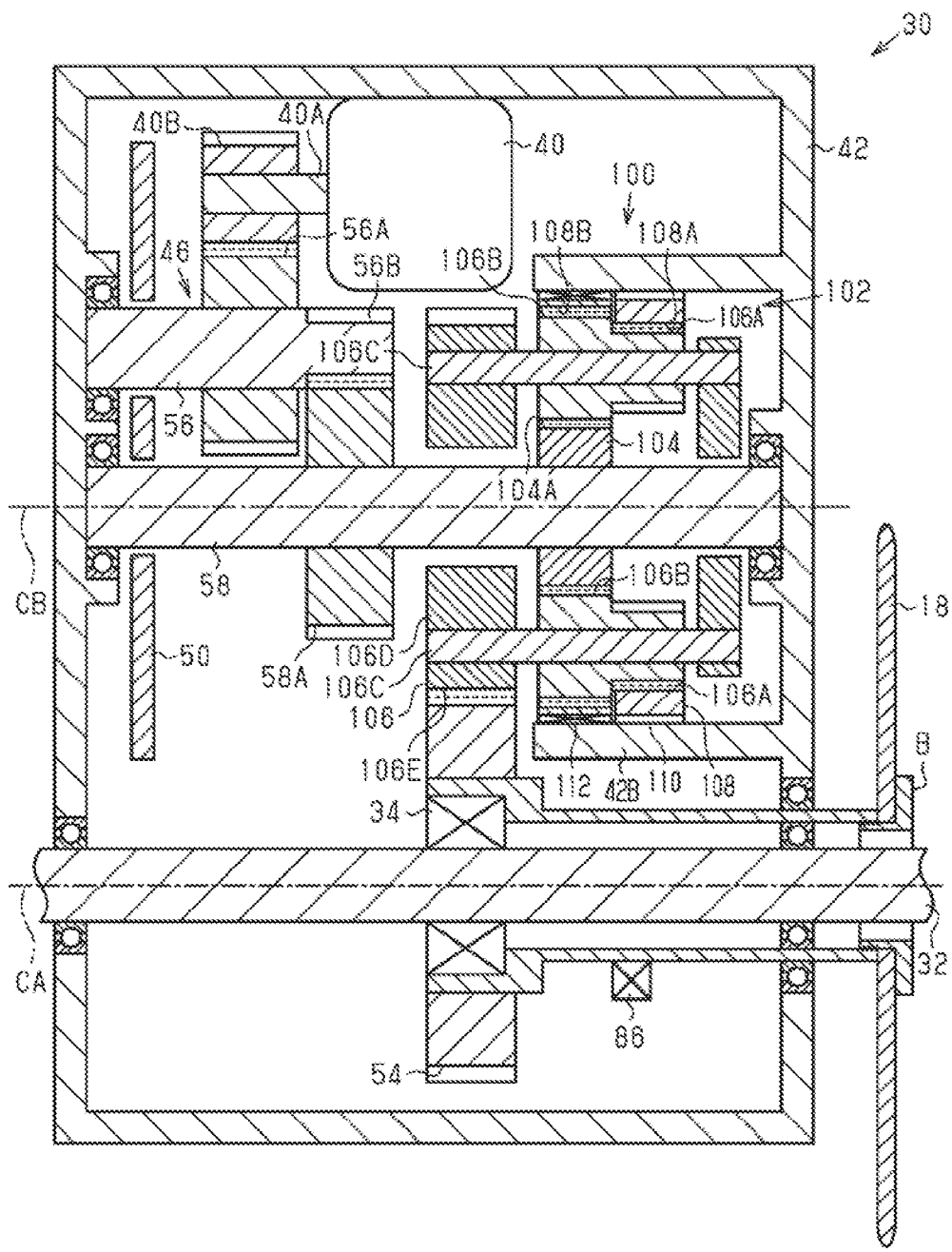
FIG. 5 is a cross-sectional view of the bicycle drive unit in accordance with a third embodiment.

The drive unit 30 of the third embodiment will be described, with reference to FIG. 5. The portions that are common to the first embodiment are given the same reference symbols, and the descriptions thereof will be omitted.

The drive unit 30 of the third embodiment comprises a planetary gear mechanism 100, a switching mechanism 102, a motor 40 and a housing 42.

The planetary gear mechanism 100 comprises an input body 104, an output body 106 and a transmission body 108. The planetary gear mechanism 100 comprises a plurality of transmission paths having different transmission ratios between the input body 104 and the output body 106. The switching mechanism 102 is configured to switch between the plurality of transmission paths.

The output body 106 comprises a plurality of first planetary gears 106A, a plurality of second planetary gears 106B, a plurality of planetary pins 106C and a carrier 106D. The second planetary gears 106B have a different total number of teeth than the first planetary gears 106A. The second planetary gears 106B are integrally rotated with the first planetary gears 106A. The number of the first planetary gears 106A and the second planetary gears 106B are equal. One of the first planetary gears 106A and one of the second planetary gears 106B are an integrally formed to form a so-called stepped planetary gear. The carrier 106D is supported by the planetary pins 106B, and rotatably supports the first planetary gears 106A and the second planetary gears 106B via the planetary pins 106C.

The transmission body 108 comprises a first ring gear 108A and a second ring gear 108B. The first ring gear 108A is engaged with the first planetary gear 106A. The second ring gear 108B is disposed coaxially with the first ring gear 108A. The second ring gear 108B is engaged with the second planetary gear 106B. The first ring gear 108A and the second ring gear 108B are supported on the support portion 42B of the housing 42. The total number of teeth of the first ring gear 108A is greater than the total number of teeth of the second ring gear 108B.

The input body 104 comprises a sun gear 104A engaging the second planetary gears 106B. The transmission body 108 transmits the rotation of the input body 104 to the output body 106. In another example, the sun gear 104A can engage the first planetary gears 106A instead of the second planetary gears 106B.

The switching mechanism 102 is configured to regulate the rotation of at least one of the first ring sun gear 108A and the second ring gear 108B. The switching mechanism 102 comprises a switching unit 110 and a one-way clutch 112. The switching unit 110 switches between a first state and a second state. In the first state, the first ring gear 108A is non-rotatable. In the second state, the first ring gear 108A is rotatable. The switching unit 110 comprises at least one pawl (not shown) that can protrude from a shifting motor (not shown) and the first ring gear 108A toward the support portion 42B. The support portion 42B comprises a cylindrical inner perimeter surface. The switching unit 110 further comprises an engagement portion that is provided on the inner perimeter part of the support portion 42B. This engagement portion has the same shape as the engagement portion 72 in the first embodiment. The switching unit 110 switches between the first state and the second state by the drive of the shifting motor. Specifically, the first state in which the first ring gear 108A is non-rotatable with respect to the support portion 42B is formed by the pawl(s) protruding toward the support portion 42B. The second state in which the first ring gear 108A is rotatable with respect to the support portion 42B is formed by the pawl(s) moving away from the support portion 42B. The switching unit 110 can be configured in any way, as long as the movement of the pawl(s) can be controlled by the shifting motor. For example, the pawl(s) of the switching unit 110 is provided on the first ring gear 108A, and is biased to a position that comes in contact with the engagement portion of the support portion 42B by a spring. The shifting motor controls the position of the pawl via a sleeve or a cam.

The one-way clutch 112 is disposed between the support portion 42B and the second ring gear 108B. The one-way clutch 112 permits rotation of the second ring gear 108B while the input body 104 is rotated by the motor 40 in the first state. The one-way clutch 112 restricts the rotation of the second ring gear 108B while the input body 104 is rotated by the motor 40 in the second state.

When the first state in which the first ring gear 108A is non-rotatable with respect to the support portion 42B is formed by the switching unit 110, the rotation of the motor 40 that is transmitted to the input body 104 causes the planetary gears 106A and 106B to revolve around the first ring gear 108A while causing the same to rotate. At this time, the carder 106D is rotated along with the planetary gears 106A and 106B, and the rotation of the carrier 106D is transmitted to the coupling member 44.

When the second state in which the first ring gear 108A is rotatable with respect to the support portion 42B is formed by the switching unit 110, the rotation of the motor 40 that is transmitted to the input body 104 causes the planetary gears 106A and 106B to revolve around the second ring gear 108B while causing the same to rotate. At this time, the carrier 106D is rotated along with the planetary gears 106A and 106B and the rotation of the carrier 106D is transmitted to the coupling member 44. The total number of teeth of the second ring gear 108B is greater than the total number of teeth of the first ring gear 108A. Accordingly, the degree of deceleration of the rotation that is inputted to the input body 104 is greater in the second transmission path via the second ring gear 108B in the second state than in the first transmission path via the first ring gear 108A in the first state.

A gear 106E is provided on the outer perimeter of the carrier 106D. The gear 106E is engaged with the gear 54 of the coupling member 44. That is, the manual drive force that is inputted to the crankshaft 32 is joined with the rotational force that is output from the output body 106 of the planetary gear mechanism 100, in a transmission path of drive force from the output body 106 of the planetary gear mechanism 100 to a wheel (not shown). According to the third embodiment, the same effects as the first embodiment are obtained.

MODIFICATIONS

The descriptions relating to each embodiment described above are examples of forms that the bicycle drive unit according to the present invention can take, and are not intended to limit the forms thereof. The bicycle drive unit according to the present invention can take the forms of the modifications of the above-described embodiments shown below, as well as forms that combine at least two modifications that are not mutually contradictory.

Figure 6:
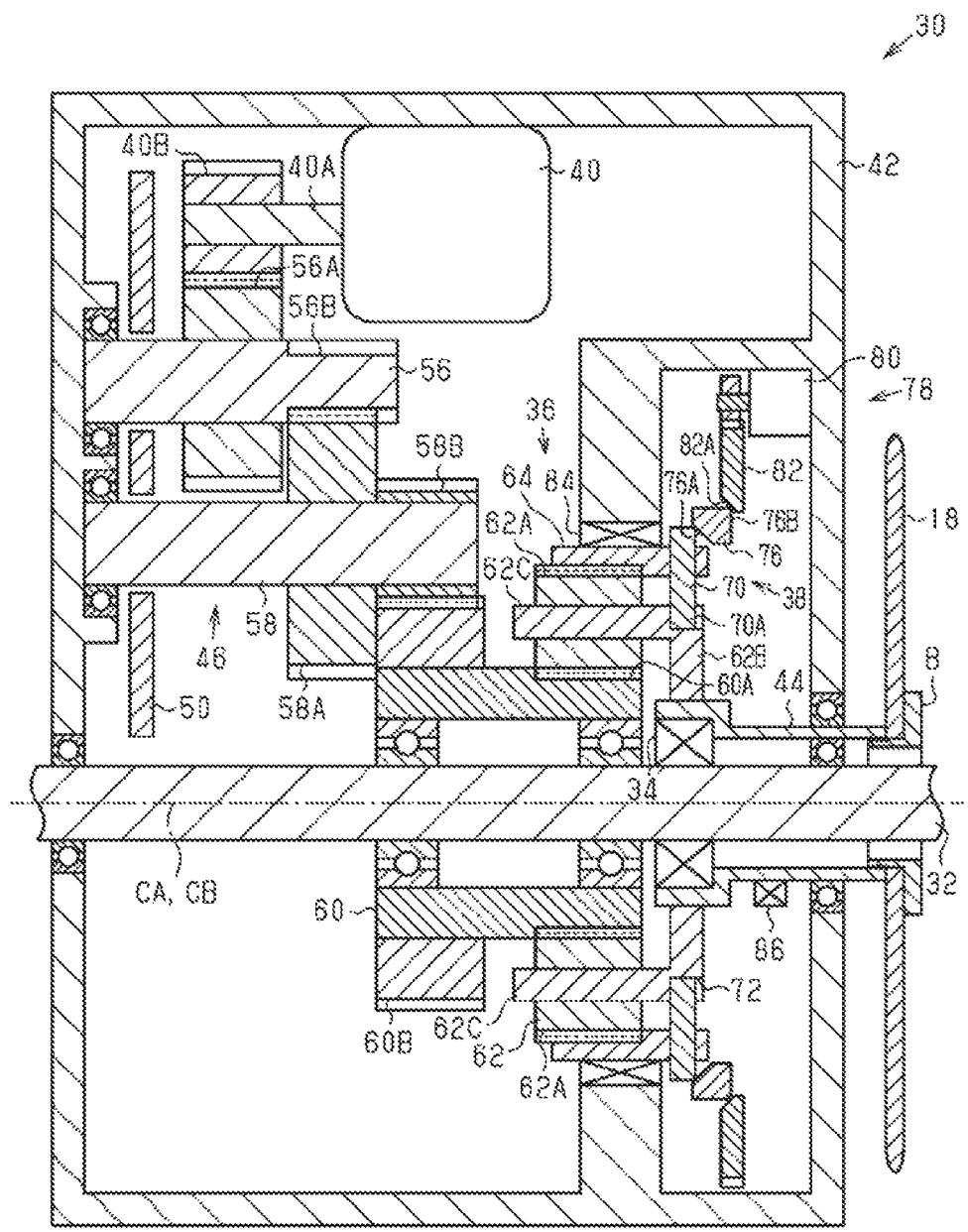
FIG. 6 is a cross-sectional view of the bicycle drive unit in accordance with a modification of the first embodiment.

The drive unit 30 of the first embodiment can be freely changed, as shown in, for example, FIG. 6. In the drive unit 30 shown in FIG. 6, the rotational axis CB of the input body 60 is disposed on the same axis as the rotational axis CA of the crankshaft 32. The input body 60 is provided around the crankshaft 32 and is rotatably supported on the crankshaft 32. The input body 60 is supported on the outer perimeter of the crankshaft 32 or the outer perimeter of the coupling member 44 via a bearing. The input body 60 further comprises a gear 60B. The gear 60B is provided coaxially with the sun gear 60A. The speed reducer 46 is provided on the second rotational shaft 58 and further comprises a gear 58B that is engaged with the gear 60B. The output body 62 is connected to the crankshaft 32 via the coupling member 44. The gear 54 is omitted from the coupling member 44. The inner perimeter of the carrier 62B is coupled to the outer perimeter part of the coupling member 44 by, for example, spline fitting. The manual drive force that is inputted to the crankshaft 32 is joined with the rotational force that is output from the output body 62 of the planetary gear mechanism 36, in a transmission path of drive force from the output body 62 of the planetary gear mechanism 36 to a wheel (not shown). The pawls 70 are provided on the transmission body 64, and the engagement portions 72 are provided on the output body 62. The engagement portions 72 are provided on the outer perimeter part of the carrier 62B. The pawls 70 are biased so as to come in contact with the engagement portions 72 of the output body 62. The pawls 70 are configured to be separated from the output body 62 by the movable member 76.

Figure 7:
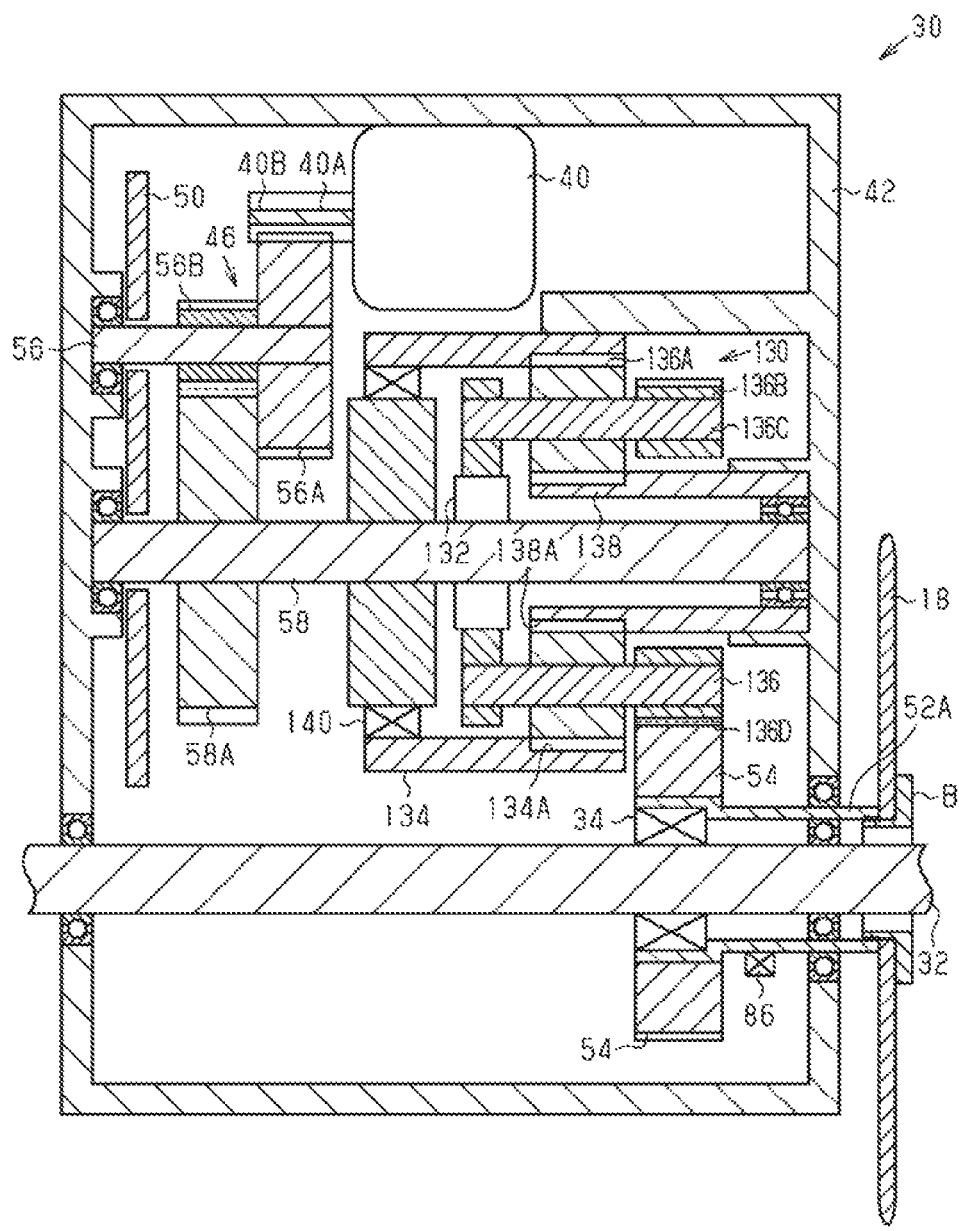
FIG. 7 is a cross-sectional view of the bicycle drive unit in accordance with a modification of the first embodiment.

The drive unit 30 of the first embodiment can be freely changed, as shown in, for example, FIG. 7. The drive unit 30 shown in FIG. 7 comprises a planetary gear mechanism 130 and a switching unit 132. The planetary gear mechanism 130 comprises an input body 134, an output body 136 and a transmission body 138. The input body 134 comprises a ring gear 134A. The output body 136 comprises a plurality of planetary gears 136A, a carrier 136B and a plurality of planetary pins 136C. The transmission body 138 comprises a sun gear 138A. A gear 136D is formed on the outer perimeter of the carrier 136B. The gear 136D is engaged with the gear 54 of the coupling member 44.

The switching, unit 132 comprises at least one pawl (not shown) that can protrude from a shifting motor (not shown) and the second rotational shaft 58 toward the carrier 136B. The switching unit 132 further comprises an engagement portion that is provided on the inner perimeter part of the carrier 136B. This engagement portion has the same shape as the engagement portion 72 in the first embodiment. The switching unit 132 switches between the first state and the second state by the drive of the shifting motor. Specifically, the first state in which the carrier 136B is non-rotatable with respect to the second rotational shaft 58 is formed by the pawl(s) protruding toward the carrier 136B. The second state in which the carrier 136B is rotatable with respect to the second rotational shaft 58 is formed by the pawl(s) moving away from the carrier 136B. The switching unit 132 can be configured in any way, as long as the movement of the pawl(s) can be controlled by the shifting motor. For example, the pawl(s) of the switching unit 132 is provided on the second rotational shaft 58, and is biased to a position that comes in contact with the engagement portion of the carrier 136B by a spring. The shifting motor controls the position of the pawl(s) via a sleeve or a cam.

The planetary gear mechanism 130 is further provided with a one-way clutch 140. The one-way clutch 140 is provided between the second rotational shaft 58 and the transmission body 138. When a relative rotation of the second rotational shaft 58 and the carrier 136B is permitted by the switching unit 132, the one-way clutch 140 transmits the rotation of the second rotational shaft 58 to the input body 60. The rotation that is inputted to the input body 60 is decelerated inside the planetary gear mechanism 36 and output from the carrier 136B to the coupling member 44. When the second rotational shaft 58 and the carrier 136B are integrally rotated by the switching unit 132, the rotation of the second rotational shaft 58 is not decelerated and output from the carrier 136B to the coupling member 44. At this time, the one-way clutch 140 permits the relative rotation between the second rotational shaft 56 and the input body 60.

The configuration of the switching mechanism 38 of the first embodiment can be freely changed. In one example, the switching mechanism 38 comprises at least one pawl and at least one engagement portion. The at least one pawl is provided on the transmission body 64 and protrudes from the transmission body 64 toward the output body 62. The at least engagement portion is provided on the output body 62 and with which the pawl(s) provided to the transmission body 64 can be engaged. In this case, the movable member 76 preferably causes the pawl(s) to operate so that the pawl(s) protrudes from the transmission body 64. Any configuration can be employed as long as a pawl(s) is provided on one of the input body 60 and the output body 62, while the engagement portion is provided on the other, and the transmission body 64 and the output body 62 are coupled in the first state.

In the switching mechanisms 90 and 102 of the second and third embodiments, pawls can be provided on the transmission bodies 96 and 108 and engagement portions can be provided on the output bodies 94 and 106. In the switching mechanism 38 of the modification shown in FIG. 6, at least one pawl can be provided on the output body 62 and at least one engagement portion can be provided on the transmission body 64. In the switching mechanism 38 of the modification shown in FIG. 6, the pawl(s) can be provided on the output body 136 and the engagement portion can be provided on the second rotational shaft 58.

The planetary gear mechanisms 36, 88 and 100 of the embodiments can be changed to a configuration in which the rotations of the input bodies 60, 92, 104 are accelerated and output from the output bodies 62, 94 and 106 in the second state. In this case, the configuration should be one in which rotation is input from a carrier and output from a sun gear or a ring gear in the planetary gear mechanisms 36, 88 and 100.

In the drive units 30 of the embodiments, the torque sensor 86 can be attached to the crankshaft 32.

In the speed reducers 46 of the embodiments, a third rotational shaft that reduces the rotational speed of the first rotational shaft 56 and transmits the rotation of the first rotational shaft 56 to the second rotational shaft 58 can be provided between the first rotational shaft 56 and the second rotational shaft 58. That is, three or more stages of deceleration can be carried out in the speed reducer 46.

The drive unit 30 in each embodiment can take a form that does not comprise the second speed reducer 46. In this case, for example, the gear 40B of the output shaft 40A of the motor 40 is connected with the input bodies 60, 92 and 104.

In the drive units 30 of the embodiments, a second speed reducer can be provided between the output bodies 62, 94 and 106 and the coupling member 44. The rotation of the output bodies 62, 94 and 106 is decelerated by the second speed reducer and output to the coupling member 44. The second speed reducer can be changed to a speed increasing mechanism as well.

In the drive unit 30 of the embodiments, a one-way clutch can be provided in a transmission path between the motor 40 and the planetary gear mechanism 36.

The drive unit 30 of the embodiments can take a form that does not comprise the crankshaft 32. In this case, the crankshaft 32 as a component of the bicycle is provided to the drive unit 30.

The position to which the drive unit 30 is provided can be freely changed. In one example, the drive unit 30 can be provided in the vicinity of the rear sprocket 20. In this case, it is possible to configure the rear wheel hub shell as the coupling member. The first planetary gear mechanism is coupled to the rear wheel hub shell. The rotation of the crankshaft 32 is transmitted to the rear wheel hub shell via the rear sprocket 20. Accordingly, the rotation of the output bodies 62, 94 and 106 is transmitted to the rear wheel hub shell, and the rotation of the crankshaft 32 is applied without interposing the planetary gear mechanism.

In the embodiments, the coupling member 44 can be omitted and the output bodies 62, 94 and 106 of the planetary gear mechanisms 36, 88 and 100 can be connected to the crankshaft 32.

In each of the embodiments, the second clutch 34 can be omitted.

In the embodiments, the output bodies 62, 94 and 106 of the planetary gear mechanisms 36, 88 and 100 can be connected to a position of the coupling member 44 that is further on the front sprocket 18 side than the portion to which the torque sensor 86 is provided. In this case, the torque sensor 86 is able to detect only the manual drive force even when the motor 40 is being driven.

In each of the embodiments, the controller 50 can be provided outside of the housing 42, or be provided on the frame of the electrically assisted bicycle 10.

In the second and the third embodiments, the planetary gear mechanisms 88, 100 can be configured to have three or more gear shift stages. For example, the configuration should be one provided with three planetary gears having different total numbers of teeth, and a sun gear and a ring gear that are individually engaged with each planetary gear, wherein the sun gear or the ring gear is selectively made non-rotatable by a control mechanism.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined" "connected" "coupled", "mounted", "bonded" "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
a planetary gear mechanism comprising an input body, an output body and a plurality of transmission paths having different transmission ratios between the input body and the output body;
a switching mechanism configured to switch between the plurality of transmission paths;
a motor configured to transmit rotational force to the input body; and
a housing configured to rotatably support a crankshaft and on which are provided the planetary gear mechanism, the switching mechanism and the motor,
wherein a manual drive force that is input to the crankshaft is joined with a rotational force that is output from the output body of the planetary gear mechanism in a transmission path of a driving force from the output body of the planetary gear mechanism to a wheel, and the manual drive force input to the crankshaft does not pass through the planetary gear mechanism.

2. The bicycle drive unit according to claim 1, wherein the output body is configured to be one of directly connected to the crankshaft and indirectly connected to the crankshaft via a coupling member that is coupled to the crankshaft.

3. The bicycle drive unit according to claim 2, wherein the coupling member is one of directly coupled to the crankshaft and indirectly connected to the crankshaft via a one-way clutch.

4. The bicycle drive unit according to claim 1, wherein the planetary gear mechanism further comprises a transmission body that transmits rotation of the input body to the output body; and
the switching mechanism is configured to switch between a first state, in which the input body and the output body integrally rotate together as a unit, and a second state in which the input body and the output body are rotated relative to each other.

5. The bicycle drive unit according to claim 4, wherein the switching mechanism comprises a switching unit that switches a connection state of the input body and the output body to the first state by connecting the transmission body and the output body, and that switches the connection state of the input body and the output body to the second state by releasing a connection between the transmission body and the output body.

6. The bicycle drive unit according to claim 5, wherein the switching unit comprises
   a pawl provided on one of the transmission body and the output body and configured to protrude from the one of the transmission body and the output body toward the other of the transmission body and the output body; and
   an engagement portion provided to the other of the transmission body and the output body in which the pawl is configured to selectively engage the engagement portion;
   the pawl is engaged with the engagement portion in the first state and the pawl is separated from the engagement portion in the second state.

7. The bicycle drive unit according to claim 4, wherein the input body comprises a sun gear;
   the output body comprises a planetary gear engaged with the sun gear and a carrier that rotatably supports the planetary gear; and
   the transmission body comprises a ring gear that is engaged with the planetary gear.

8. The bicycle drive unit according to claim 4, wherein the input body has a rotational axis that is offset from a rotational axis of the crankshaft.

9. The bicycle drive unit according to claim 4, wherein the input body has a rotational axis that is coaxial with a rotational axis of the crankshaft.

10. The bicycle drive unit according to claim 5, wherein the switching mechanism further comprises an actuator configured to control the switching unit.

11. The bicycle drive unit according to claim 10, wherein the switching unit comprises
    a pawl provided on and protruding from one of the transmission body and the output body toward the other of the transmission body and the output body; and
    an engagement portion provided to the other of the transmission body and the output body in which the pawl is configured to selectively engage the engagement portion;
    the pawl is engaged with the engagement portion in the first state and the pawl is separated from the engagement portion in the second state, and
    the actuator comprises
       a biasing member applying a force to the pawl so that the pawl projects from one of the transmission body and the output body;
       a movable member configured to cause the pawl to operate so that the pawl moves away from the engagement portion by coming in contact with the pawl; and
       a drive unit configured to switch between the first state and the second state by moving the movable member.

12. The bicycle drive unit according to claim 10, wherein the switching unit comprises
    a pawl provided on and protruding from one of the transmission body and the output body toward the other of the transmission body and the output body; and
    an engagement portion provided to the other of the transmission body and the output body in which the pawl is configured to selectively engage the engagement portion;
    the pawl is engaged with the engagement portion in the first state and the pawl is separated from the engagement portion in the second state, and
    the actuator comprises
       a biasing member applying a force to the pawl so that the pawl moves away from the engagement portion;
       a movable member configured to cause the pawl to operate so that the pawl projects from one of the transmission body and the output body by coming in contact with the pawl; and
       a drive unit configured to switch between the first state and the second state by moving the movable member.

13. The bicycle drive unit according to claim 4, further comprising
    a support portion configured to support the transmission body,
    the switching mechanism further comprising a one-way clutch that is disposed between the support portion and the transmission body; and
    the one-way clutch being configured to permit rotation of the transmission body in a first direction and prevent rotation of the transmission body in a second direction, which is the opposite of the first direction.

14. The bicycle drive unit according to claim 1, wherein the planetary gear mechanism further comprises a transmission body that transmits rotation of the input body to the output body; and
    the output body and the transmission body each comprise a plurality of gears having different total numbers of teeth.

15. The bicycle drive unit according to claim 14, wherein the output body comprises
    a first planetary gear;
    a second planetary gear that has a different total number of teeth than the first planetary gear and that integrally rotates with the first planetary gear; and
    a carrier that rotatably supports the first planetary gear and the second planetary gear;
    the transmission body comprises:
    a first sun gear that is engaged with the first planetary gear; and
    a second sun gear that is disposed coaxially with the first sun gear and that is engaged with the second planetary gear;
    the input body comprises a ring gear that is engaged with one of the first planetary gear and the second planetary gear; and
    the switching mechanism is configured to restrict rotation of at least one of the first sun gear and the second sun gear.

16. The bicycle drive unit according to claim 15, wherein a total number of teeth of the second sun gear is greater than a total number of teeth of the first sun gear.

17. The bicycle drive unit according to claim 15, wherein the switching mechanism comprises
    a support shaft that rotatably supports the first sun gear and the second sun gear; and
    a switching unit that switches between a first state, in which the first sun gear is non-rotatable with respect to the support shaft, and a second state, in which the first sun gear is rotatable with respect to the support shaft.

18. The bicycle drive unit according to claim 17, wherein
the switching mechanism further comprises a one-way clutch that is disposed between the support shaft and the second sun gear; and
the one-way clutch is configured to permit rotation of the second sun gear when the input body is rotated by the motor in the first state.

19. The bicycle drive unit according to claim 14, wherein
the output body comprises
- a first planetary gear;
- a second planetary gear that has a different total number of teeth than the first planetary gear and that integrally rotates with the first planetary gear; and
- a carrier that rotatably supports the first planetary gear and the second planetary gear; and the transmission body comprises
- a first ring gear that is engaged with the first planetary gear; and
- a second ring gear that is disposed coaxially with the first ring gear and that is engaged with the second planetary gear;

the input body comprises a sun gear that is engaged with one of the first planetary gear and the second planetary gear; and
the switching mechanism is configured to restrict rotation of at least one of the first ring gear and the second ring gear.

20. The bicycle drive unit according to claim 19, wherein
a total number of teeth of the first ring gear is greater than a total number of teeth of the second ring gear.

21. The bicycle drive unit according to claim 19, wherein
the switching mechanism comprises a switching unit that switches between a first state, in which the first ring gear is non-rotatable, and a second state, in which the first ring gear is rotatable.

22. The bicycle drive unit according to claim 21, further comprising
a support portion supporting the first ring gear and the second ring gear,
the switching mechanism further comprising a one-way clutch that is disposed between the support portion and the second ring gear; and
the one-way clutch is configured to permit rotation of the second ring gear while the input body is rotated by the motor in the first state.

23. The bicycle drive unit according to claim 1, further comprising
a speed reducer connected to the motor and the input body, and configured to reduce a rotational speed of the motor and transmit rotation to the input body.

24. The bicycle drive unit according to claim 1, further comprising
the crankshaft.

* * * * *